US011371974B2

(12) United States Patent
Smyth et al.

(10) Patent No.: US 11,371,974 B2
(45) Date of Patent: Jun. 28, 2022

(54) INDICATOR DEVICE

(71) Applicant: INSIGNIA TECHNOLOGIES LIMITED, North Lanarkshire (GB)

(72) Inventors: Erik Smyth, Dundee (GB); Graham Alexander Skinner, Renfrew (GB)

(73) Assignee: INSIGNIA TECHNOLOGIES LIMITED, North Lanarkshire (GB)

( * ) Notice: Subject to any disclaimer, the term of this patent is extended or adjusted under 35 U.S.C. 154(b) by 551 days.

(21) Appl. No.: 16/309,816

(22) PCT Filed: Jun. 13, 2017

(86) PCT No.: PCT/GB2017/051716
§ 371 (c)(1),
(2) Date: Dec. 13, 2018

(87) PCT Pub. No.: WO2017/216542
PCT Pub. Date: Dec. 21, 2017

(65) Prior Publication Data
US 2019/0137463 A1 May 9, 2019

(30) Foreign Application Priority Data
Jun. 13, 2016 (GB) ...................................... 1610250

(51) Int. Cl.
*G01N 31/22* (2006.01)
(52) U.S. Cl.
CPC .................................. *G01N 31/229* (2013.01)
(58) Field of Classification Search
CPC .................................................... G01N 31/229
See application file for complete search history.

(56) References Cited

U.S. PATENT DOCUMENTS 5,633,835 A 5/1997 Haas et al.
10,247,713 B2 * 4/2019 Smyth .................... G01N 21/78
(Continued)

FOREIGN PATENT DOCUMENTS

JP 2004-330451 11/2004
WO 2006/021953 3/2006
(Continued)

OTHER PUBLICATIONS

PCT International Search Report, International Application No. PCT/GB2017/051716, dated May 12, 2017, pp. 1-5.

*Primary Examiner* — Samuel P Siefke
(74) *Attorney, Agent, or Firm* — David S. Bradin; Nexsen Pruet, PLLC

(57) ABSTRACT

There is described an indicator device comprising: an indicator section comprising an indicator material that displays different visible properties in response to the presence or absence of an activating agent; an activator section comprising an activating agent that effects a change in the visible properties of the indicator material; and a barrier section comprising a barrier layer that is substantially impermeable to the activating agent, the barrier section being located between the indicator section and the activator section; wherein at least part of the barrier layer is configurable to allow the activating agent and the indicator material to come into contact with each other, thereby effecting a visible change. The device may be used to detect or report the passage of time and can be applied to perishable goods and/or associated packaging to show that packaging has been compromised and/or that the device has been compromised.

21 Claims, 9 Drawing Sheets

(56) References Cited

U.S. PATENT DOCUMENTS

2001/0018095 A1    8/2001  Shlenker et al.
2004/0013839 A1*   1/2004  Ko ..................... G09F 3/0291
                                                        428/40.1
2014/0259332 A1    9/2014  Hassan et al.

FOREIGN PATENT DOCUMENTS

| WO |    2012/141594    | 10/2012 |
| WO |    2014/053846    | 4/2014  |
| WO |    2014/132065    | 9/2014  |
| WO | WO 2014/132065  * | 9/2014  |

* cited by examiner

INDICATOR DEVICE

This application is a National Stage Application of PCT Application No. PCT/GB2017/051716, filed Jun. 13, 2017, which claims priority to GB Application No. 1610250.1, filed Jun. 13, 2016. The disclosures of each of these documents is hereby incorporated by reference in its entirety.

FIELD OF INVENTION

The present invention relates to an indicator device, a method for preparing an indicator device, and products derived therefrom. In particular, the present invention relates to a laminated indicator device that is stable until it is activated. The products derived therefrom may include, for example, a multilayer adhesive sticker, which (once activated) can be used to detect or report the passage of time. The indicator device can also be used to show that packaging has been compromised and/or that a device has been compromised.

Perishable goods, and in particular drinks and foodstuffs, are often provided in some form of air-tight packaging. This packing can be applied in a modified atmosphere (known as modified atmosphere packaging (MAP)), which limits the presence of oxygen and which often involves purging the packaging with carbon dioxide. Alternatively, perishable goods may be packaged in normal atmospheric conditions.

Items that are packaged in air-tight packaging include: food, beverages, works of art, pharmaceuticals, medical diagnostic kits and sterilised packages. It is particularly desirable in the food industry to package goods such that their exposure to atmospheric conditions (and in particular, oxygen) after packaging is minimised. This can be used to effectively extend the shelf life of many perishable items.

BACKGROUND ART

Many different indicators and sensors for detecting the passage of time or for detecting when a package has been opened have been developed. Many of these depend on gas diffusion or similar related technologies. In particular, many of these are effective only over short time periods, are unstable before activation, and/or respond only to external agents such as oxygen or carbon dioxide.

Therefore, it is an object of the present invention to obviate or mitigate at least some of the disadvantages of the prior art.

A further object of the invention is to provide an indicator device that can be applied to perishable goods such as food or drink and/or associated packaging, pharmaceuticals or chemical reagents and/or associated packaging, or any item where it is desirable to detect that the item has been opened, or where it is desirable to detect for how long an item has been opened.

DISCLOSURE OF INVENTION

According to a first aspect of the invention there is provided an indicator device comprising:
  an indicator section comprising an indicator material that displays different visible properties in response to the presence or absence of an activating agent;
  an activator section comprising an activating agent that effects a change in the visible properties of the indicator material; and
  a barrier section comprising a barrier layer that is substantially impermeable to the activating agent, the barrier section being located between the indicator section and the activator section;
  wherein at least part of the substantially impermeable barrier layer is configurable to allow the activating agent and the indicator material to come into contact with each other, thereby effecting a change in visible properties of the indicator material.

The indicator device may be for indicating the passage of time.

The indicator device may be a laminate, or multi-layered, product.

The indicator material may be part of a composition. Depending on the nature of the indicator material, the indicator material, or indicator composition, may be activated by UV light, a reducing agent, an oxidising agent, carbon dioxide, a base, an alkali or an acid.

The indicator device may be configured to detect a change (increase or decrease) in the amount (i.e., the concentration) of any of the activating agent in the device, or a change in pH.

At least part of the substantially impermeable barrier layer may be removable and/or rupturable.

On removal of and/or rupture of at least part of the substantially impermeable barrier layer, the activating agent and the indicator material may come into contact with each other, thereby effecting a change in visible properties of the indicator material.

The indicator material may display different visible properties in response to the concentration of the activating agent.

The indicator device may further comprise a semi-permeable barrier layer configured to allow controlled movement of the activating agent to the indicator material.

The semi-permeable barrier layer may be located between the indicator section and the activator section.

The semi-permeable barrier layer may be located between the indicator material and the activating agent.

The semi-permeable barrier layer may be located between the substantially impermeable barrier layer and the indicator material.

The semi-permeable barrier layer may have a thickness of between approximately 1 µm and approximately 100 µm.

The semi-permeable barrier layer may be selected from one or more of the group consisting of: polyethylene, polyethylene terephthalate, low density polyethylene, polypropylene, polyurethane and polyvinyl chloride.

The semi-permeable barrier layer may comprise low density polyethylene.

The substantially impermeable barrier layer may have a thickness of between approximately 12 µm and approximately 100 µm.

The substantially impermeable barrier layer may be selected from one or more of the group consisting of: polyethylene terephthalate, ethylene vinyl alcohol, polyvinylidene chloride, polyvinyl acetate, polypropylene, polyester and aluminium oxide coated polyethylene terephthalate.

The activating agent may be a chemical agent.

The activating agent may migrate to the indicator material.

The indicator device may further comprise one or more adhesive layers.

The one or more adhesive layers may be located adjacent to or between one or more of the sections, layers, materials and/or agents.

The one or more adhesive layers may have a thickness of between approximately 1 µm and 3 µm.

The one or more adhesive layers may be selected from one or more of the group consisting of: a rubber based hot melt, an acrylic adhesive, a varnish coated adhesive, an adhesive kill treated adhesive, a treated or coated permanent acrylic, a treated or coated peelable acrylic, a UV curing adhesive, a pressure sensitive adhesive, and UV curable pressure sensitive adhesive.

The substantially impermeable barrier layer may comprise a detachable section and optionally a fixed section.

Where the detachable section and the fixed section meet there may be provided a separable portion. The separable portion may be a substantially continuous cut line.

The detachable section and the fixed section may be adjacent. The detachable section and the fixed section may be separate from each other. The detachable section and the fixed section may be separated by a substantially continuous cut line. The detachable section and the fixed section may be in physical contact with each other.

The detachable section and the fixed section may be connected by a frangible portion.

The frangible portion may be a perforated portion.

The indicator device may further comprise a first adhesive layer located between or adjacent to the substantially impermeable barrier layer and the indicator material.

The first adhesive layer may be arranged such that it is in contact with the fixed section, the detachable section and the separable portion, and wherein at least part of the detachable section is adhesive free.

The separable portion may be sealed, the seal configured to mitigate the activating agent and the indicator material from coming into contact with each other.

The first adhesive layer may be located adjacent to the substantially impermeable barrier layer and arranged such that it covers at least the separable portion, thereby sealing the separable portion.

The majority of the detachable section may be adhesive free.

The first adhesive layer may be arranged in a pattern having an outer adhesive layer and an inner adhesive layer, the separable portion being positioned between the outer adhesive layer and the inner adhesive layer.

The inner adhesive layer may define an enclosed space. The inner adhesive layer may be in the shape of a ring or the like. At least part of the indicator material may be surrounded by the inner adhesive layer.

The inner adhesive layer may wholly surround the indicator material.

The first adhesive layer may be located between or adjacent to the substantially impermeable barrier layer and a support section or a substrate layer.

The adhesive used for the inner adhesive layer may be of a lower adhesive strength than the adhesive used for the outer adhesive layer.

The inner adhesive layer may be a pressure sensitive adhesive and the outer adhesive layer may be a permanent bond laminating adhesive.

The ring of adhesive may have a width of from about 0.3 mm to about 0.9 mm.

The indicator device may further comprise a second adhesive layer located between or adjacent to the substantially impermeable barrier layer and the activating agent.

The second adhesive layer may be arranged in a pattern having an outer adhesive layer and an inner adhesive layer, the separable portion being positioned between the outer adhesive layer and the inner adhesive layer.

The inner adhesive layer may define an enclosed space. The inner adhesive layer may be in the shape of a ring or the like.

At least part of the activating agent may be surrounded by the inner adhesive layer.

The inner adhesive layer may wholly surround the activating agent.

The second adhesive layer may be located between or adjacent to the substantially impermeable barrier layer and the activator section.

The adhesive used for the inner adhesive layer may be of a lower adhesive strength than the adhesive used for the outer adhesive layer.

The inner adhesive layer may be a pressure sensitive adhesive and the outer adhesive layer may be a permanent bond laminating adhesive.

The ring of adhesive may have a width of from about 0.3 mm to about 0.9 mm.

The first and/or the second adhesive layer may have a thickness of between approximately 1 μm and 3 μm.

The first and/or the second adhesive layer(s) may be selected from one or more of the group consisting of: a rubber based hot melt, an acrylic adhesive, a varnish coated adhesive, an adhesive kill treated adhesive, a treated or coated permanent acrylic, a treated or coated peelable acrylic, a UV curing adhesive, a pressure sensitive adhesive, and UV curable pressure sensitive adhesive.

The detachable section may further comprise a tab, optionally a pull-tab.

The detachable section may be peelable or may comprise a peel mechanism.

The indicator device may further comprise a support section.

The support section may comprise a barrier layer that is substantially impermeable to the activating agent.

The indicator section may comprise a substrate material.

The indicator material may be incorporated into a discrete indicator layer and the substrate material may be incorporated into a discrete substrate layer, separate to the indicator layer.

The substrate layer may have a thickness of between approximately 12 μm and approximately 100 μm.

The substrate material may be selected from one or more of the group consisting of: aluminium oxide foil, polypropylene, and polyethylene terephthalate.

The indicator layer may have a thickness of between approximately 1 μm and approximately 3 μm.

The indicator material may comprise a polymer binder optionally selected from one or more of the group consisting of: polyvinyl butyral (PVB), nitrocellulose (NC), polyvinyl alcohol (PVA), hydroxyethyl cellulose (HEC), hydroxypropyl cellulose (HPC), polyethylene glycol (PEG) and polyethylenimine (PEI).

The indicator material may comprise a polymer binder optionally selected from one or more of the group consisting of: polyvinyl butyral (PVB), hydroxypropyl cellulose (HPC), polyethylene glycol (PEG) and polyethylenimine (PEI).

The indicator layer may comprise a plasticiser optionally selected from one or more of the group consisting of: tributyl phosphate, diisodecyl adipate, tris-2-ethylhexyl phosphate, tributyl phosphate, glycerol and dimethyl phthalate.

Optionally, the indicator material and the substrate material are incorporated into the same layer so-forming a combined indicator and substrate layer, and wherein the indicator material is dispersed within the substrate material or vice versa.

The combined indicator and substrate layer may comprise a polymer composite, said polymer composite comprising at least one thermoplastic polymer, and at least one chemical indicator dispersed in the at least one thermoplastic polymer, the at least one chemical indicator comprising a particulate inorganic substrate, and at least one indicator material, reactive dye or ink coated on and/or impregnated within the particulate inorganic substrate.

The combined indicator and substrate layer may have a thickness of between approximately 30 µm and approximately 100 µm.

The indicator material may be selected from one or more of the group consisting of: a redox sensitive material, a carbon monoxide sensitive material, a carbon dioxide sensitive material, an oxygen sensitive material, an amine sensitive material, an ammonia sensitive material, a pH sensitive material, and an acid sensitive material.

The pH sensitive material may be selected from one or more of the group consisting of: m-Cresol Purple (MCP, Hydroxy triarylmethane), Thymolphthalein (3,3-bis(4-hydroxy-2-methyl-5-propan-2-ylphenyl)-2-benzofuran-1-one), o-Cresolphthalein (3,3-Bis(4-hydroxy-3-methylphenyl)-1(3H)-isobenzofuranone), Acryloly florescein (AcF1), 13-methyl umbelliferon (BMUB), Bromothymol blue (BTB, Hydroxy triarylmethane), 5' and 6-Carboxyseminaphtholfluorescein (c-SNAFL), S' and 6'-Carboxyseminaphtholrhodamine (c-SNARF), Cresol Red (CR, o-Cresolsulfonephthalein), 2-(2,4-Dinitrophenylaxo)-1-naphthol-3,6-disulphonic acid (DNPA), tris(thenoyltrifluoroacetonato) europium (III) (Eu(tta)1), Fluorescein (Fl, resorcinolphthalein), 7-hydroxycoumarin-4-acetic acid (HCA), 1, Hydroxypyrene-3,6,S-trisulphonic acid (HPTS), Neutral red (NR, toluylene red), Phenol Red (PR, phenolsulfonphthalein), Rhodamine 6G (R6G), Sulforhodamine 101 (SRh), Thymol blue (TB, thymolsulphonephthalein), Texas Red hydrazine (THR), Phenolphthalein (3,3-bis(4-hydroxyphenyl)isobenzofuran-1(3H)-one), Thymol blue, Phenoltetraiodophthalein, Phenoltetrachlorophthalein, α-Naphtholbenzein and p-Xylenol blue.

The pH sensitive material may be selected from one or more of the group consisting of: Phenol Red (PR, phenolsulfonphthalein), m-Cresol Purple (MCP, Hydroxy triarylmethane) and Cresol Red (CR, o-Cresolfonephthalein).

The pH sensitive material may have a pKa value equal to or greater than approximately 7.9, optionally equal to or greater than approximately 8.3, optionally equal to or greater than approximately 8.32.

The pH sensitive material may have a pKa value of between approximately 7.9 and approximately 8.3, optionally between approximately 7.9 and approximately 8.32.

The pH sensitive material may be an acid sensitive material.

The indicator device may further comprise a release section adjacent a support section and detachable therefrom.

An adhesive layer may be located between the release section and the support section.

The release section may comprise a release layer.

The release layer may have a thickness of between approximately 50 µm and approximately 100 µm, optionally between approximately 60 µm and approximately 70 µm.

The release layer may be selected from one or more of the group consisting of: glassine, siliconised glassine paper, and a silicon treated polymer.

The indicator section, the activator section and the support section may be located between the release section and the barrier section.

The activating agent may be at least one of an oxidising agent, water, carbon dioxide, amines, acids, carboxylic acids, ammonium hydroxide and ammonia.

The activating agent may be an acid.

The activating agent may be an organic acid.

The acid may be selected from one or more of the group consisting of: aromatic acids, aliphatic acids, and cyclic acids.

The acid may be selected from one or more of the group consisting of: aromatic carboxylic acids, aliphatic carboxylic acids, and cyclic carboxylic acids.

The acid may be selected from one or more of the group consisting of: benzoic acid, o-toluic acid (2-methylbenzoic acid), 4-ethylbenzoic acid, 2,4-dimethyl benzoic acid, p-toluic acid (4-methylbenzoic acid), salicylic acid (2-hydroxybenzoic acid), decanoic acid, undecanoic acid, dodecanoic acid, 4-methylnonanoic acid, 4-ethyloctanoic acid, 1-Methyl-1-cyclohexanecarboxylic acid, 2-butyloctanoic acid, tridecanoic acid, tetradecanoic acid, pentadecanoic acid, 3-hydroxybenzoic acid, 4-hydroxybenzoic acid, cyclohexanecarboxylic acid, nonanoic acid, and cyclohexaneacetic acid.

The acid may have a melting point of at least approximately 20° C., optionally between approximately 20° C. and approximately 220° C., optionally between approximately 27° C. and approximately 217° C.

The acid may have a molecular weight of between approximately 100 gmol$^{-1}$ and approximately 300 gmol$^{-1}$, optionally between approximately 120 gmol$^{-1}$ and approximately 230 gmol$^{-1}$, optionally between approximately 122 gmol$^{-1}$ and approximately 200 gmol$^{-1}$.

According to a second aspect of the invention, there is provided a package or packaging comprising the indicator device as described in the first aspect.

According to a third aspect of the invention there is provided a tape or film comprising the indicator device as described in the first aspect.

According to a fourth aspect of the invention, there is provided a method of detecting the passage of time, comprising the steps of:
a) providing an indicator device as described in the first aspect;
b) activating the indicator device; and
c) subsequently detecting a visible change in the indicator material whereby the passage of time is revealed.

According to a fifth aspect of the invention, there is provided a method of detecting whether a sealed package has been compromised, comprising the steps of:
a) providing an indicator device as described in the first aspect;
b) activating the indicator device; and
c) subsequently detecting a visible change in the indicator material whereby the compromise of the package is revealed.

The alternative features and different embodiments as described apply to each and every aspect and each and every embodiment thereof mutatis mutandis.

A particulate inorganic substrate is understood to be defined as a substrate which is typically made of an insoluble material, and which is provided in a particulate form. This typically includes inorganic fillers and/or inorganic pigments, which may be white, transparent, or coloured. In the context of the invention an insoluble material is understood to be defined as a material that is insoluble in a water-based or organic solvent in which the indicator material or composition ink is intended to be dissolved, prior to coating and/or impregnating within the particulate inorganic substrate.

The particulate inorganic substrate may be in powder form. Typically, the particulate inorganic substrate may be an inorganic pigment, e.g. silica, titania, alumina, magnesium oxide, calcium oxide or a zeolite.

The at least one chemical indicator may be substantially uniformly dispersed in the at least one polymer.

The polymer composite may comprise a melt-processed polymer composite, preferably extruded, and may be provided in the form of e.g. a film, sheet, tube, or any other suitable profile.

The at least one thermoplastic polymer may comprise an addition polymer such as a polyolefin, e.g. polyethylene or polypropylene, or another thermoplastic addition polymer, e.g. polystyrene or a polyacrylate. Alternatively, the at least one thermoplastic polymer may comprise a condensation polymer, e.g. polycarbonate, polyether, polyester, polyamide or polyacetal.

In one embodiment, the at least one thermoplastic polymer may be a hydrophobic polymer, e.g. polyethylene. In such instance, the at least one chemical indicator may comprise a hydrophobic particulate inorganic substrate, e.g. hydrophobic silica or hydrophobic alumina.

The indicator device of the present invention can be applied to foodstuffs and the like by end users in the home. Alternatively, it can be used in a commercial setting such as the catering and retail industries. The indicator device enables accurate assessment of the amount of time since a foodstuff was first exposed to air or opened, or the amount of time since a foodstuff was prepared. The indicator device can be used to indicate when a sealed package has been compromised. Therefore, the indicator device can be used to indicate when a foodstuff is no longer fit for consumption or it can be used to show when a sealed package has been opened. This helps to prevent both consumption of unfit foodstuffs and the unnecessary disposal of consumable foodstuffs.

BRIEF DESCRIPTION OF THE DRAWINGS

Embodiments of the invention will now be described, by way of example only, with reference to the drawings, in which.

DETAILED DESCRIPTION

Figure 1:
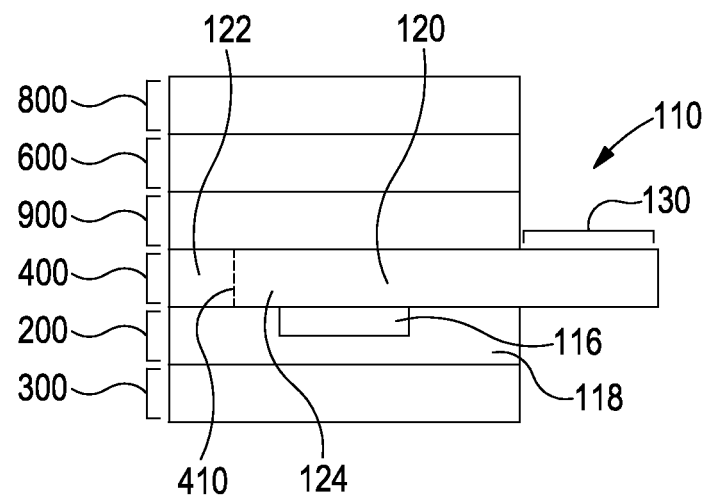
FIG. 1 is a cross section of an indicator device.

Examples of Preparation of Acid Composition for Acid Activation Layer

An acid composition for use in an acid activation layer was prepared as follows.

To 10 g of 15% (w/w) hydroxypropyl cellulose in ethanol was added 0.025 moles of acid compound, 2 mL of ethanol and 2 g of glycerol.

Typical of acid compounds that can be used in the above composition are benzoic acid, o-toluic acid (2-methylbenzoic acid), 4-ethylbenzoic acid, 2,4-dimethyl benzoic acid, p-toluic acid (4-methylbenzoic acid), salicylic acid (2-hydroxybenzoic acid), decanoic acid, undecanoic acid, dodecanoic acid, 4-methylnonanoic acid, 4-ethyloctanoic acid, 1-Methyl-1-cyclohexanecarboxylic acid, 2-butyloctanoic acid, tridecanoic, tetradecanoic acid, pentadecanoic acid, 3-hydoxybenzoic acid, 4-hydroxybenzoic acid, cyclohexanecarboxylic acid, nonanoic acid, and cyclohexaneacetic acid.

The acid compound used is typically an organic acid, such as an aromatic acids, aliphatic acids, or cyclic acids. In particular, aromatic carboxylic acids, aliphatic carboxylic acids, and cyclic carboxylic acids are useful.

The acid composition or compound acts as an activating agent.

Particular acids are selected depending on the desired time for the colour change of the indicator device. This is because it has been found that different acids have different migratory properties, and therefore take different amounts of time to change the colour of the indicator material.

Also, the acid concentration suggested above can be increased or decreased in order to provide a faster (higher concentration) or slower (lower concentration) colour change of the indicator material.

It should also be noted that using acid compositions or compounds with different pKa values will also vary the rate of colour change.

The acid compound is typically a solid at room temperature, and thus would normally have melting point of at least approximately 20° C. Typical melting point ranges for the acids described are between approximately 20° C. and approximately 220° C., and may, for example, vary between approximately 27° C. and approximately 217° C.

The molecular weight of the acid can also affect how quickly it migrates and causes a colour change. Typical molecular weights are between approximately 100 gmol$^{-1}$ and approximately 300 gmol$^{-1}$, and can be between approximately 120 gmol$^{-1}$ and approximately 230 gmol$^{-1}$, and may for example be between approximately 122 gmol$^{-1}$ and approximately 200 gmol$^{-1}$.

Examples of Preparation of Ink for Indicator Layer

Preparation of a (pH) Acid Sensitive Ink

A pH (acid) sensitive ink was prepared as follows.

To prepare a sample of ink, 5 g of 15% (w/w) hydroxypropyl cellulose in ethanol was weighed and to it was added 0.5 g of glycerol. The solution was gently stirred. To the solution was then added 3 mL of 40% (w/w) tetrabutylammonium hydroxide in water, and the solution was again gently stirred. Finally, 0.5 g of Phenol Red (PR, phenolsulfonphthalein), 5 mL of 40% (w/w) tetrabutylammonium hydroxide in water and 2 mL of ethanol was added and the solution was stirred.

The Phenol Red ink changes colour depending on pH. In particular, the ink is pink above pH 8.2 and transitions through red and orange to yellow below pH 6.8.

Alternative indicator compounds are m-Cresol Purple (MCP, Hydroxy triarylmethane), Thymolphthalein (3,3-bis (4-hydroxy-2-methyl-5-propan-2-ylphenyl)-2-benzofuran-1-one), o-Cresolphthalein (3,3-Bis(4-hydroxy-3-methylphenyl)-1(3H)-isobenzofuranone), Acryloly florescein (AcF1), 13-methyl umbelliferon (BMUB), Bromothymol blue (BTB, Hydroxy triarylmethane), 5' and 6-Carboxyseminaphtholfluorescein (c-SNAFL), 5' and 6'-Carboxyseminaphtholrhodamine (c-SNARF), Cresol Red (CR, o-Cresolsulfonephthalein), 2-(2,4-Dinitrophenylaxo)-1-naphthol-3,6-disulphonic acid (DNPA), tris(thenoyltrifluoroacetonato) europium (III) (Eu(tta)1), Fluorescein (Fl, resorcinolphthalein), 7-hydroxycoumarin-4-acetic acid (HCA), 1, Hydroxypyrene-3,6,S-trisulphonic acid (HPTS), Neutral red (NR, toluylene red), Rhodamine 6G (R6G), Sulforhodamine 101 (SRh), Thymol blue (TB, thymolsulphonephthalein), Texas Red hydrazine (THR), Phenolphthalein (3,3-bis(4-hydroxyphenyl)isobenzofuran-1(3H)-one), Thymol blue, Phenoltetraiodophthalein, Phenoltetrachlorophthalein, α-Naphtholbenzein and p-Xylenol blue.

In particular, indicator compounds are chosen from Phenol Red (PR, phenolsulfonphthalein, pKa=7.9), m-Cresol Purple (MCP, Hydroxy triarylmethane, pKa=8.3) and Cresol Red (CR, o-Cresolsulfonephthalein, pKa=8.32).

Alternative polymers are polyvinyl butyral (PVB), nitrocellulose (NC), polyvinyl alcohol (PVA), hydroxyethyl cellulose (HEC), polyethylene glycol (PEG) and polyethylenimine (PEI).

The polymer and/or the indicator materials used are soluble in ethanol or the solvent being used.

Alternative bases/agents for deprotonating the indicator compound are potassium hydroxide, calcium hydroxide, caesium hydroxide, magnesium hydroxide, tetrabutylammonium hydroxide, tetraoctylammonium hydroxide.

The pH (acid) sensitive ink described above comprises a polymer binder (hydroxypropyl cellulose), a colour changing dye (Phenol Red), a base or agent for deprotonating the dye (tetrabutylammonium hydroxide) and a solvent (ethanol).

Other inks that can be used with the device of the present invention can be prepared by combining a binder material (often a polymer), a dye and a plasticiser. A solvent is typically added to make a printable ink solution. Typical formulations are as illustrated below.

Base Sensitive Example Ink Formulation 1

50 g of 15% w/v polyvinyl butyral and 5 mL of 40 mg/mL bromophenol blue in ethanol were combined to make a first base sensitive ink. 4 g of this first solution were combined with 0.2 mL of tributyl phosphate to create a base version of the ink.

Base Sensitive Example Ink Formulation 2

50 g of 15% w/v polyvinyl butyral and 5 mL of 20 mg/mL Bromophenol blue in ethanol were combined to make a first base sensitive ink. 4 g of this first base sensitive ink were combined with 0.3 mL of tributyl phosphate to create a base version of the ink.

Base Sensitive Example Ink Formulation 3

50 g of hydraCOAT HV 1105 S F and 5 mL of 160 mg/mL bromophenol blue in ethanol were combined to make a first base sensitive ink. 4 g of this base sensitive ink solution were combined with 0.1 mL of tributyl phosphate to create a base version of the ink.

Acids

Using acids that are solids at typical room temperature (for example, 15° C. to 25° C.) ordinarily results in stable indicator devices.

Acids that can be used include aliphatic, aromatic and cyclic acids such as, for example: aliphatic carboxylic acids, aromatic carboxylic acids and cyclic carboxylic acids.

Acids that can be used, and their typical properties, are as described above.

Plasticiser

Higher quantities of plasticiser typically shortens the time the indicators take to change colour, whereas decreasing the plasticiser content lengthens the time.

Plasticisers that can be used include diisodecyl adipate, tris-2-ethylhexyl phosphate, tributyl phosphate and dimethyl phthalate. Without wishing to be bound by theory, it is thought that in one embodiment glycerol acts as a plasticiser.

Binder

Different polymers have different permeabilities to activating agents, hence changing the polymer can alter the times. Since the timers are based on diffusion, the timers take longer to change colour at lower temperatures than higher temperatures (i.e. a timer stored in the fridge will take longer to change colour than when stored at room temperature).

Polymer binders that can be used include polyvinyl butyral (PVB), nitrocellulose (NC), polyvinyl alcohol (PVA), hydroxyethyl cellulose (HEC) and hydroxypropyl cellulose (HPC), polyethylene glycol (PEG) and polyethylenimine (PEI).

Preparation of Combined Indicator and Substrate Layer

The combined indicator and substrate layers were prepared in accordance with the procedure and materials outlined in GB 2474571, the contents of which are incorporated herein by reference.

Silica (silicon dioxide) and alumina (aluminium oxide) were chosen as inorganic substrates for preparation of the indicators. Silica pigment was found to be a particularly suitable inorganic substrate because of its wide utilisation as a polymer filler, low cost, ready availability, ease of handling, safety, and lack of colour (white). Indicators were prepared using both hydrophobic pigments (silica or alumina), and hydrophilic pigments (silica or alumina).

Titania was also used in connection with the preparation of oxygen-sensitive indicators. Titania was chosen because it is a semiconducting material which can act as a photocatalyst in the reduction and thus the activation of certain oxygen-sensitive dyes.

The compounds that were used in the preparation of pH (acid) sensitive indicators were: cresol red, meta-cresol purple and phenol red. Alternative compounds as listed herein can, of course, be used.

Hydrophobic Silica or Alumina for $CO_2$ indicators

Approximately 0.04 g of pH (acid) sensitive indicator (indicator material) was added to a beaker containing 2.0 g of hydrophobic silica (Degussa/Evonik Aerosil R812; S.S.A.=260+/−30 $m^2/g$; average particle size=7 nm) and approximately 100 mL of methanol. 1 mL of 1M tetrabutylammonium hydroxide in methanol was added. The mixture was well stirred/sonicated, the resulting solution was transferred to a round-bottomed flask and the methanol removed with the aid of a rotary evaporator at 30° C. under vacuum. The resultant powder was removed and ground into a fine powder using a pestle and mortar.

Pigments based on hydrophobic alumina (Degussa/Evonik Aeroxide Alu C805), rather than silica were also prepared as above and proved equally effective.

Alternative bases to tetrabutylammonium hydroxide can also be used, including sodium hydroxide and sodium bicarbonate.

Alternative solvents to methanol can also be used, including ethanol, ethyl acetate and/or water.

Hydrophilic Silica or Alumina for $CO_2$ Indicators

Typically, a lower ratio of dye to inorganic pigment was used with hydrophilic silica (Degussa/Evonik Aerosil 300) and hydrophilic alumina (Degussa/Evonik Aeroxide Alu C).

To 15.0 g of hydrophilic silica (Degussa/Evonik Aerosil 300), 0.12 g of indicator material was added. Approximately 100 mL water and 12 mL of 1.5 M tetrabutylammonium hydroxide in water was added. After stirring, the solvent (water) was evaporated under reduced pressure to produce a fine powder.

Pigments based on hydrophilic alumina (Degussa/Evonik Aeroxide Alu C), rather than silica were also prepared as above and proved equally effective.

Titania

Titania was used in connection with the preparation of certain oxygen-sensitive indicators. Titania was chosen because, in particular grades, it is a semiconducting material which can act as a photocatalyst in the reduction and thus the activation of certain oxygen-sensitive indicators. Because titania must be able to act as more than a support and drive the photoreduction of the dye to a form that is oxygen sensitive, the titania inorganic substrate was chosen in an untreated form so as to preserve its photocatalytic properties.

Incorporation in Polymer a) Hydrophobic Polymers

Polyethylene was chosen as a particularly suitable hydrophobic polymer due to its low cost, ease of manufacture and processability, and wide range of applications, including food packaging and medical applications.

In order to be compatible with polyethylene, the indicators used for incorporation into such polymer films were indicators based on hydrophobic silica, hydrophobic alumina, or untreated titania.

Typically 0.4 g of the hydrophobic indicator was added to 2.0-4.0 g of powdered polyethylene. The two powders were further ground until the colour was uniform. A small sample of the resulting powder was heat pressed at 115° C. for 5 minutes under 5 tonnes pressure using a Specac Atlas™ Series Heated Platens, before being allowed to cool. A 0.1 mm-thick plastic film was obtained.

This procedure is similar to that used in making extruded polymer films in which the pigment is dispersed, thus producing very thin polymer films.

b) Hydrophilic Polymers

Polyethylene oxide was chosen as a suitable hydrophilic polymer.

In order to be compatible with polyethylene oxide, the indicators used for incorporation into such polymer films were indicators based on hydrophilic silica, hydrophilic alumina, or untreated titania.

Typically 0.4 g of the hydrophilic indicator was added to 2.0-4.0 g of powdered polyethylene oxide. The two powders were further ground until the colour was uniform. A small sample of the resulting powder was heat pressed at 65° C. for 5 minutes under 5 tonnes pressure using a Specac Atlas™ Series Heated Platens, before being allowed to cool. A 0.1 mm-thick plastic film was obtained.

Example Combined Indicator and Substrate Layer

A meta-cresol purple aqueous hydrophilic silica (Aerosil 150) dispersion was prepared. This was then spray-dried to produce a dry free-flowing 'intelligent pigment'.

A masterbatch formulation was prepared according to the following formula:

59.5% by weight low density polyethylene (LDPE)
20% by weight linear low density polyethylene (LLDPE)
20% by weight intelligent pigment (from above)
0.5% by weight zinc stearate.

The masterbatch was used to make an indicator film having a combined indicator and substrate.

The prepared indicator film has a three layer co-extruded structure, in which the core layer contains intelligent pigment at 5% to 20% by weight. The outer layers generally consist of LDPE or medium density polyethylene (MDPE), however these can be varied to give varying film properties.

The combined indicator and substrate layer can be prepared as a film by spray-drying, master-batching and film extrusion, using standard industrial techniques.

EXAMPLES

Referring now to FIG. 1, there is shown at 110 an indicator device in accordance with one embodiment of the invention. The indicator device 110 has a (pH/acid sensitive) indicator section 200 and an activator (acid containing) section 600 separated by an adhesive section 900 and a polyethylene terephthalate (PET) barrier section 400, which has a barrier layer 120 that is substantially impermeable to the activating agent. The activator section 600 includes an activating agent in the form of an acid compound or composition. Suitable acid compounds are as described herein (see "Examples of Preparation of Acid Composition for Acid Activation Layer", and also Tables 1 and 2). The indicator device 110 further comprises a further support section 800, which acts as a lid, preventing the acid from the activator section 600 from coming into contact with the user or the goods to which the indicator device 110 is applied. The support section 800 can also be used to prevent the acid from the activator section 600 from coming into contact with the outside environment. The adhesive section 900 and the activator section 600 may be patterned so that the support section 800 is adhered to the barrier section 400 by the adhesive section 900.

The substantially impermeable barrier layer 120 has a fixed section 122 and a removable or detachable section 124 separated where they meet by a continuous cut line 410. The cut line 410 acts as a separable (or breakable) portion (or connection) located between the fixed section 122 and the removable or detachable section 124. The barrier section 400 comprises a pull-tab 130, configured to allow a user to remove the detachable section 124 from the fixed section 122 by exerting a pulling force on the substantially impermeable barrier layer 120, thereby causing the substantially impermeable barrier layer 120 to disconnect, rupture or break along the cut line 410.

The indicator section 200 contains a combined indicator and substrate layer 116 prepared as described above. The combined indicator and substrate layer 116 comprises an indicator material dispersed within a substrate material or vice versa. The substrate material in this example is low density polyethylene which is interspersed with Phenol Red coated/impregnated particulate inorganic substrate (silica, alumina or titania). Suitable indicator materials and combined indicator and substrate layers are as described herein (see "Examples of Preparation of Ink for Indicator Layer", "Preparation of Combined Indicator and Substrate Layer" and Tables 1 and 2).

An adhesive 118 is located between the combined indicator and substrate layer 116 and a support section 300, the support section 300 typically being made from polyethylene terephthalate. The adhesive 118 is also located between a portion of the substantially impermeable barrier section 400 and the support section 300. In particular, the adhesive 118 is arranged such that it covers at least part of the substantially impermeable barrier section 400 or layer 120, particularly the cut line 410 in the substantially impermeable barrier layer 120.

Ensuring that the cut line 410 is covered with adhesive as described above prevents (or at least mitigates) the acid compound from the activator section 600 from migrating to the combined indicator and substrate layer 116 before the indicator device 110 is activated. This means that the indicator device 110 is very stable, and has good shelf life, being able to remain stored in the non-activated state for a number of months or years.

In addition to the adhesive layer 118 described, further adhesive layers can be used to attach one or more of the sections, layers and/or materials are described. The adhesive can be a pressure sensitive UV curing adhesive layer or similar.

The combined indicator and substrate layer 116 comprises a polymer composite, the polymer composite comprising a thermoplastic polymer, and a chemical indicator dispersed in the thermoplastic polymer. The chemical indicator comprises a particulate inorganic substrate, and an indicator material (Phenol Red in this example), reactive dye, or ink coated on and/or impregnated within the particulate inorganic substrate.

Figure 2:
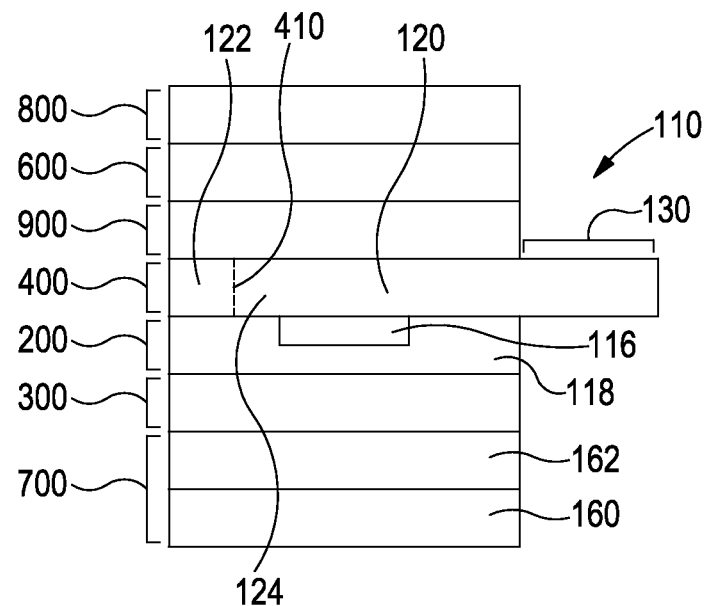
FIG. 2 is a cross section of an alternative indicator device.

Referring now to FIG. 2, there is shown at 110 an indicator device in accordance with one embodiment of the invention. The indicator device 110 is as described in FIG. 1, with the addition of a release section 700, which has a release layer 160 and an adhesive layer 162, and which is located next to the support section 300.

Figure 3:
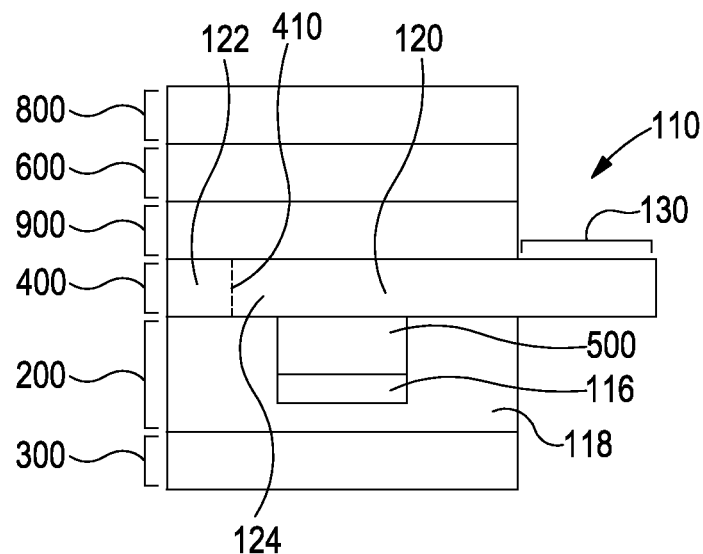
FIG. 3 is a cross section of a further alternative indicator device.

Referring now to FIG. 3, there is shown at 110 an indicator device in accordance with one embodiment of the invention. The indicator device 110 is as described in FIG. 1, with the addition of a low density polyethylene semi-permeable barrier section of layer 500 located between the substantially impermeable barrier section 400 and the combined indicator and substrate layer 116. Alternative semi-permeable barrier materials can be used as described herein.

Figure 4:
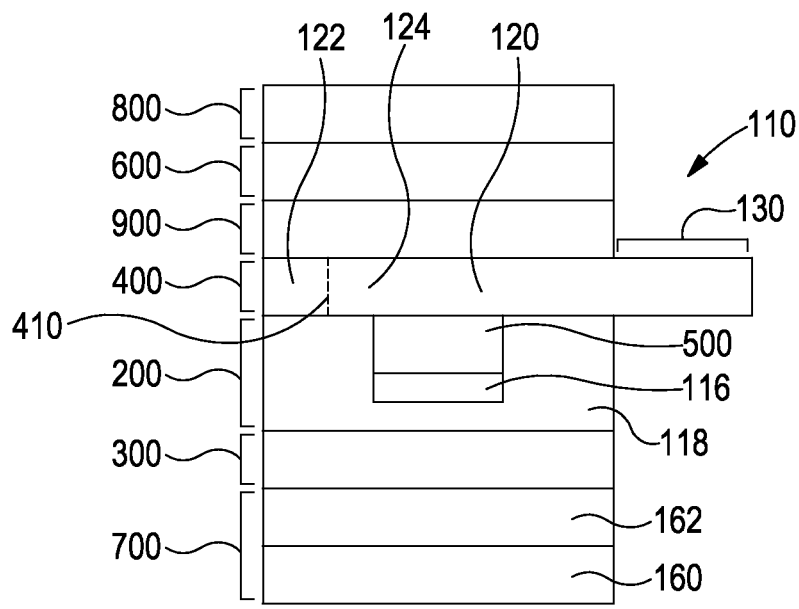
FIG. 4 is a cross section of a further alternative indicator device.

Referring now to FIG. 4, there is shown at 110 an indicator device in accordance with one embodiment of the invention. The indicator device 110 is as described in FIG. 1, with the addition of a release section 700, which has a release layer 160 and an adhesive layer 162, and which is located next to the support section 300; and with the addition of a low density polyethylene semi-permeable barrier section of layer 500 located between the substantially impermeable barrier section 400 and the combined indicator and substrate layer 116. Alternative semi-permeable barrier materials can be used as described herein.

Figure 5:
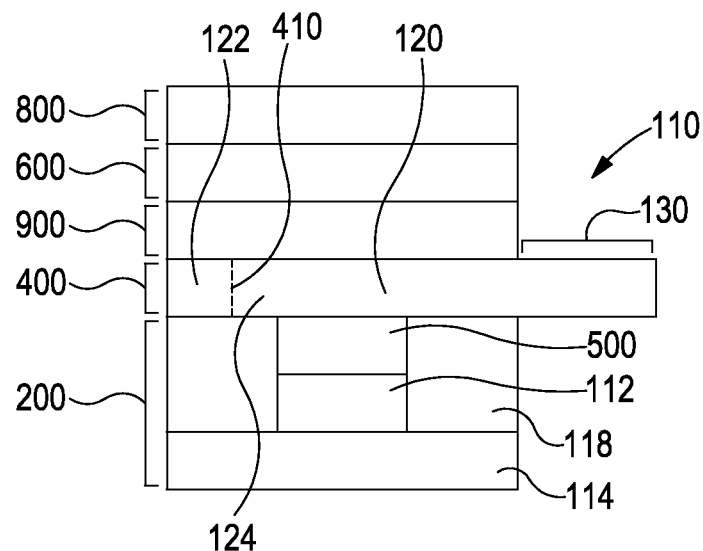
FIG. 5 is a cross section of a further alternative indicator device.

Referring now to FIG. 5, there is shown at 110 an indicator device in accordance with one embodiment of the invention. The indicator device 110 has a (pH/acid sensitive) indicator section 200 and an activator (acid containing) section 600 separated by an adhesive section 900 and a polyethylene terephthalate (PET) barrier section 400, which has a barrier layer 120 that is substantially impermeable to the activating agent. The activator section 600 includes an activating agent in the form of an acid compound or composition. Suitable acid compounds are as described herein (see "Examples of Preparation of Acid Composition for Acid Activation Layer", and also Tables 1 and 2). The indicator device 110 further comprises a further support section 800, which acts as a lid, preventing the acid from the activator section 600 from coming into contact with the user or the goods to which the indicator device 110 is applied. The support section 800 can also be used to prevent the acid from the activator section 600 from coming into contact with the outside environment. The adhesive section 900 and the activator section 600 may be patterned so that the support section 800 is adhered to the barrier section 400 by the adhesive section 900.

The substantially impermeable barrier layer 120 has a fixed section 122 and a removable or detachable section 124 separated where they meet by a continuous cut line 410. The cut line 410 acts as a separable (or breakable) portion (or connection) located between the fixed section 122 and the removable or detachable section 124. The barrier section 400 comprises a pull-tab 130, configured to allow a user to remove the detachable section 124 from the fixed section 122 by exerting a pulling force on the substantially impermeable barrier layer 120, thereby causing the substantially impermeable barrier layer 120 to disconnect, rupture or break along the cut line 410.

The indicator section 200 consists of a polyethylene terephthalate (PET) substrate layer 114 onto which is coated a Phenol Red ink formulation as described above, so-forming an indicator layer 112. Alternative indicator compounds and/or alternative inks as described herein can, of course, be used. Suitable indicator materials and substrate materials are as described herein (see "Examples of Preparation of Ink for Indicator Layer", "Preparation of Combined Indicator and Substrate Layer" and Tables 1 and 2).

The indicator device 110 also has a low density polyethylene semi-permeable barrier section or layer 500 located between the substantially impermeable barrier section 400 and the indicator layer 112. Alternative semi-permeable barrier materials can be used as described herein.

An adhesive 118 is located between the substantially impermeable barrier section 400 and the substrate layer 114, the substrate layer 114 typically being made from polyethylene terephthalate. The adhesive 118 is also located between a portion of the substantially impermeable barrier section 400 and the substrate layer 114. In particular, the adhesive 118 is arranged such that it covers at least part of the substantially impermeable barrier section 400 or layer 120, particularly the cut line 410 in the substantially impermeable barrier layer 120.

Ensuring that the cut line 410 is covered with adhesive as described above prevents (or at least mitigates) the acid compound from the activator section 600 from migrating to the indicator layer 112 before the indicator device 110 is activated. This means that the indicator device 110 is very stable, and has good shelf life, being able to remain stored in the non-activated state for a number of months or years.

In addition to the adhesive layer 118 described, further adhesive layers can be used to attach one or more of the sections, layers and/or materials are described. The adhesive can be a pressure sensitive UV curing adhesive layer or similar.

Figure 6:
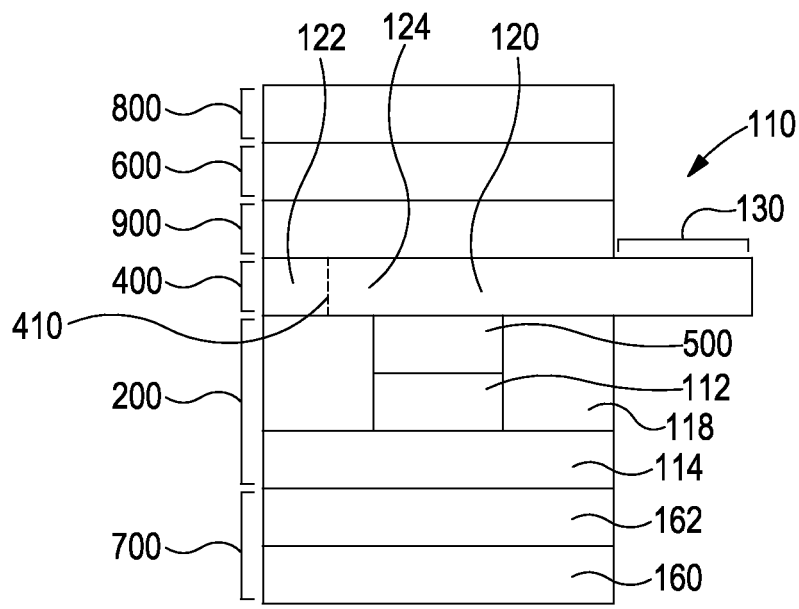
FIG. 6 is a cross section of a further alternative indicator device.
Figure 7A:
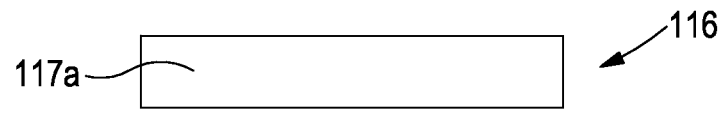
FIGS. 7a to 7d are cross sections of a combined indicator and substrate layer.
Figure 7B:
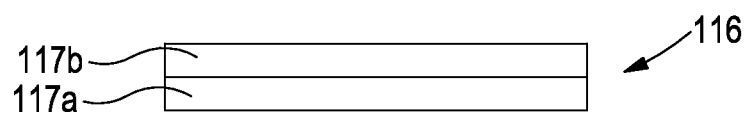
Figure 7C:
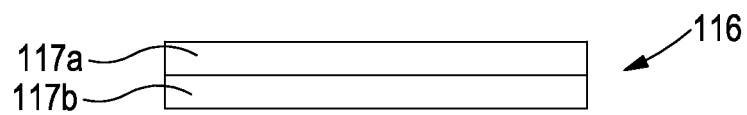
Figure 7D:
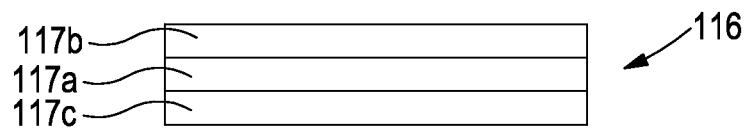

Referring now to FIG. 6, there is shown at 110 an indicator device in accordance with one embodiment of the invention. The indicator device 110 is as described in FIG. 5, with the addition of a release section 700, which has a release layer 160 and an adhesive layer 162, and which is located next to the substrate layer 114.

Referring now to FIGS. 7a-7d, there is shown at 116 four different embodiments of the combined indicator and substrate layer 116 having layers 117a, 117b and 117c. Layer 117a is a combined substrate and indicator layer as described herein and containing indicator material. Layer 117b does not contain indicator material and therefore can act as a semi-permeable barrier layer, depending on the orientation of the combined indicator and substrate layer 116 within the indicator device. Likewise, layer 117c does not contain indicator material and therefore can act as a semi-permeable barrier layer, depending on the orientation of the combined indicator and substrate layer 116 within the indicator device. The layers 117a, 117b and 117c can be coextruded.

Figure 8A:
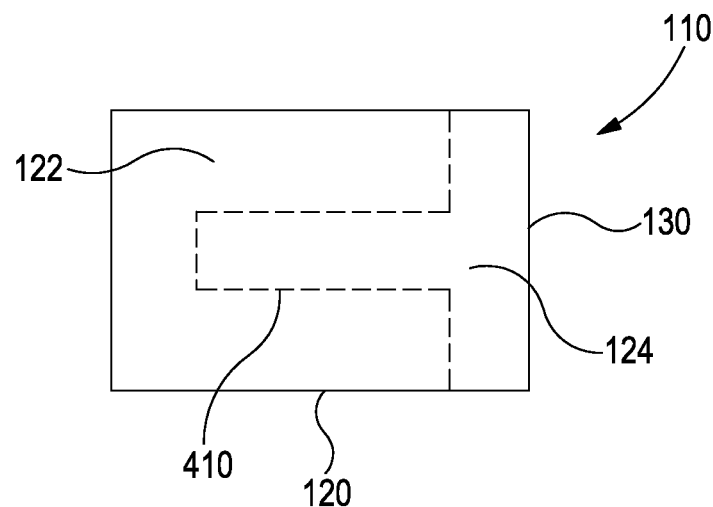
FIGS. 8a and 8b are plan views of a substantially impermeable barrier layer or section with a removable section in place and removed.

Referring now to FIG. 8a, there is shown a cutaway of the indicator device 110 showing in plan view the substantially impermeable barrier layer 120. The substantially impermeable barrier layer has a fixed section 122 and a removable or detachable section 124 separated by a continuous cut line 410. The cut line 410 acts as a separable (or breakable) portion (or connection) located between the fixed section 122 and the removable or detachable section 124. The barrier section comprises a pull-tab 130, configured to allow a user to remove the detachable section 124 from the fixed section 122 by exerting a pulling force on the substantially impermeable barrier layer 120, thereby causing the substantially impermeable barrier layer 120 to disconnect, rupture or break along the cut line 410, and causing the detachable section 124 and the fixed section 122 to become separated.

Figure 8B:
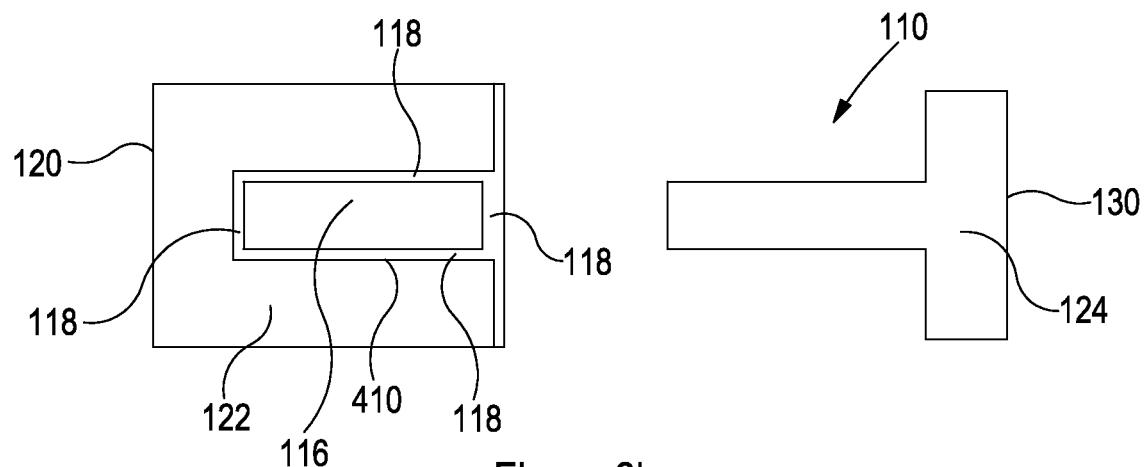

Referring to FIG. 8b, there is shown the same plan view as disclosed in FIG. 8a, but with the detachable section 124 having been removed from the fixed section 122, thereby activating the indicator device 110. This exposes combined indicator and substrate layer 116 (or the indicator layer or the semi-permeable barrier layer as the case may be) thereby allowing the acid to migrate to the indicator material, causing a change in the colour of the indicator material over time. Also illustrated is the adhesive 118 and, in particular, it can be seen that the adhesive 118 overlaps the cut line 410. It is useful for stability to ensure that the adhesive overlaps the cut line 410 as this ensures that acid does not migrate to the indicator material prior to activation of the indicator device 110 by removal of the detachable section 124. The detachable section 124 can be peelable or can comprise a peel mechanism. Alternatively, the entire barrier section 400 can be peelable or can comprise a peel mechanism.

Figure 9:
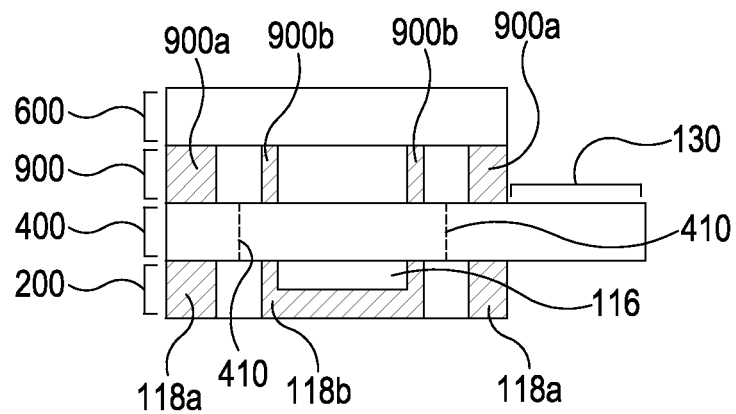
FIG. 9 is a cross section of an alternative arrangement of activator, adhesive, barrier and indicator sections.

Referring now to FIG. 9, there is shown an alternative arrangement of the activator layer 600, the adhesive layer 900, the substantially impermeable barrier layer 400 and indicator layer 200 of the indicator device 110 as described in FIGS. 1 and 2. In particular, there is shown an activator section 600 and a substantially impermeable barrier layer 400 (having a pull-tab 130), between which is located an adhesive section 900. The adhesive section 900 has a particular adhesive pattern having strips of adhesive 900a around the perimeter and a ring (or donut) of adhesive 900b towards the centre. The substantially impermeable barrier layer 400 is located between the adhesive section 900 and the indicator section 200. Within the indicator section there is an adhesive layer 118 with a particular adhesive pattern having strips of adhesive 118a around the perimeter and a ring (or donut) of adhesive 118b towards the centre. Inside the ring of adhesive 118b there is a combined indicator and substrate layer 116.

Also shown are cut lines 410 in the substantially impermeable barrier layer 400. The cut lines 410 are located between the strips of adhesive 118a, 900a around the perimeter and the ring of adhesive 118b, 900b towards the centre. In such an arrangement, the strips of adhesive 118a, 900a around the perimeter are an outer adhesive layer and the ring of adhesive 118b, 900b towards the centre is an inner adhesive layer.

It will be appreciated that the rings of adhesive 118b, 900b can be any suitable shape or geometrical pattern, provided there is a space with no adhesive within the shape or geometrical pattern.

Inside the ring of adhesive 118b there is a combined indicator and substrate layer 116. The activator section 600 is a strip of acid that transverses the ring of adhesive 118b.

Figure 10:
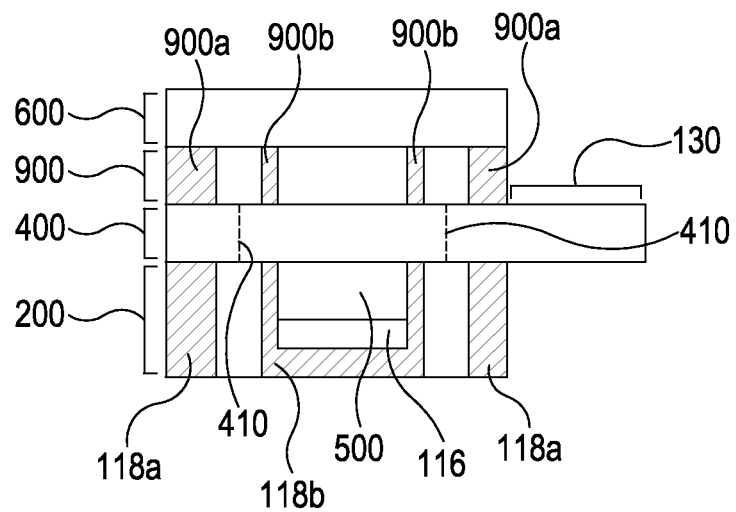
FIG. 10 is a cross section of an alternative arrangement of activator, adhesive, barrier and indicator sections.

Referring now to FIG. 10, there is shown an alternative arrangement of the activator layer 600, the adhesive layer 900, the substantially impermeable barrier layer 400 and indicator layer 200 of the indicator device 110 as described in FIGS. 3 and 4. In particular, there is shown an activator section 600 and a substantially impermeable barrier layer 400 (having a pull-tab 130), between which is located an adhesive section 900. The adhesive section 900 has a particular adhesive pattern having strips of adhesive 900a around the perimeter and a ring (or donut) of adhesive 900b towards the centre. The substantially impermeable barrier layer 400 is located between the adhesive section 900 and the indicator section 200. Within the indicator section there is an adhesive layer 118 with a particular adhesive pattern having strips of adhesive 118a around the perimeter and a ring (or donut) of adhesive 118b towards the centre. Inside the ring of adhesive 118b there is a combined indicator and substrate layer 116.

Also shown are cut lines 410 in the substantially impermeable barrier layer 400. The cut lines 410 are located between the strips of adhesive 118a, 900a around the perimeter and the ring of adhesive 118b, 900b towards the centre. In such an arrangement, the strips of adhesive 118a, 900a around the perimeter are an outer adhesive layer and the ring of adhesive 118b, 900b towards the centre is an inner adhesive layer.

It will be appreciated that the rings of adhesive 118b, 900b can be any suitable shape or geometrical pattern, provided there is a space with no adhesive within the shape or geometrical pattern.

Inside the ring of adhesive 118b there is a combined indicator and substrate layer 116 covered by a semi-permeable barrier section or layer 500. The activator section 600 is a strip of acid that transverses the ring of adhesive 118b.

Figure 11:
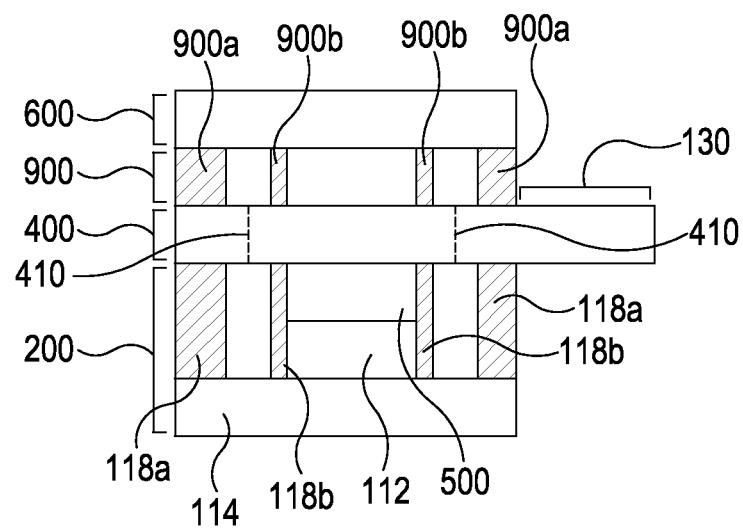
FIG. 11 is a cross section of an alternative arrangement of activator, adhesive, barrier and indicator sections.

Referring now to FIG. 11, there is shown an alternative arrangement of the activator layer 600, the adhesive layer 900, the substantially impermeable barrier layer 400 and indicator layer 200 of the indicator device 110 as described in FIGS. 5 and 6. In particular, there is shown an activator section 600 and a substantially impermeable barrier layer 400 (having a pull-tab 130), between which is located an adhesive section 900.

The adhesive section 900 has a particular adhesive pattern having strips of adhesive 900a around the perimeter and a ring (or donut) of adhesive 900b towards the centre. The substantially impermeable barrier layer 400 is located between the adhesive section 900 and the indicator section 200. Within the indicator section there is an adhesive layer 118 with a particular adhesive pattern having strips of adhesive 118a around the perimeter and a ring (or donut) of adhesive 118b towards the centre. Inside the ring of adhesive 118b there is a combined indicator and substrate layer 116.

Also shown are cut lines 410 in the substantially impermeable barrier layer 400. The cut lines 410 are located between the strips of adhesive 118*a*, 900*a* around the perimeter and the ring of adhesive 118*b*, 900*b* towards the centre. In such an arrangement, the strips of adhesive 118*a*, 900*a* around the perimeter are an outer adhesive layer and the ring of adhesive 118*b*, 900*b* towards the centre is an inner adhesive layer.

It will be appreciated that the rings of adhesive 118*b*, 900*b* can be any suitable shape or geometrical pattern, provided there is a space with no adhesive within the shape or geometrical pattern.

Inside the ring of adhesive 118*b* there is an indicator layer 112 covered by a semi-permeable barrier section or layer 500. The activator section 600 is a strip of acid that transverses the ring of adhesive 118*b*.

In the embodiments illustrated in FIGS. 9, 10 and 11, the adhesive ring 900*b* encapsulates a portion of the acid strip 600 that transverses it, preventing that portion from migrating. However, the portion of the acid strip 600 located outside of the adhesive ring 900*b* is able to migrate. Therefore, there is a second adhesive ring 118*b* surrounding the indicator material (112, 116), thus preventing the acid located outside of the adhesive ring 900*b* from migrating to the indicator material (112, 116) until the indicator device 110 is activated by removal of part of the substantially impermeable barrier layer 400.

Figure 12:
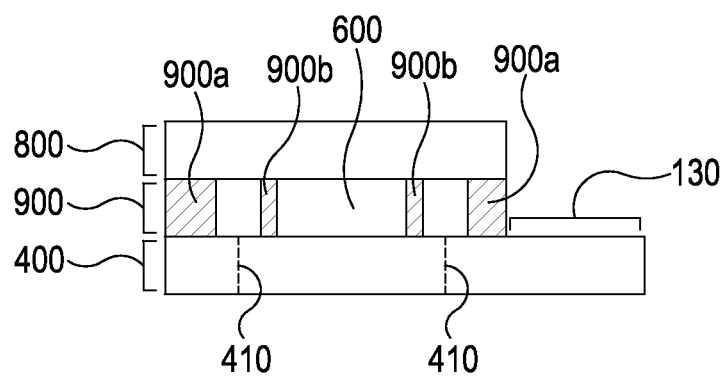
FIG. 12 is a cross section of an alternative arrangement of support, activator, adhesive and barrier sections.

Referring now to FIG. 12, there is shown an alternative arrangement of the support layer 800, the adhesive layer 900, the activator layer 600 and the substantially impermeable barrier layer 400 of the indicator device 110 as described in FIG. 1, 2, 3, 4, 5 or 6. In particular, there is shown a support section 800 and a substantially impermeable barrier layer 400 (having a pull-tab 130), between which is located an adhesive section 900.

The adhesive section 900 has a particular adhesive pattern having strips of adhesive 900*a* around the perimeter and a ring (or donut) of adhesive 900*b* towards the centre. The substantially impermeable barrier layer 400 is located between the adhesive section 900 and the indicator section 200.

Also shown are cut lines 410 in the substantially impermeable barrier layer 400. The cut lines 410 are located between the strips of adhesive 900*a* around the perimeter and the ring of adhesive 900*b* towards the centre. In such an arrangement, the strips of adhesive 900*a* around the perimeter are an outer adhesive layer and the ring of adhesive 900*b* towards the centre is an inner adhesive layer.

It will be appreciated that the rings of adhesive 900*b* can be any suitable shape or geometrical pattern, provided there is a space with no adhesive within the shape or geometrical pattern.

Encapsulated by the ring of adhesive 900*b* is an activator section 600, which comprises a portion of acid. As the activator section is wholly encapsulated by the ring of adhesive 900*b*, the acid is prevented from migrating. As there is no acid located outside of the ring of adhesive 900*b*, there is no requirement for an additional ring of adhesive around the indicator material 112, 116.

Figure 13:
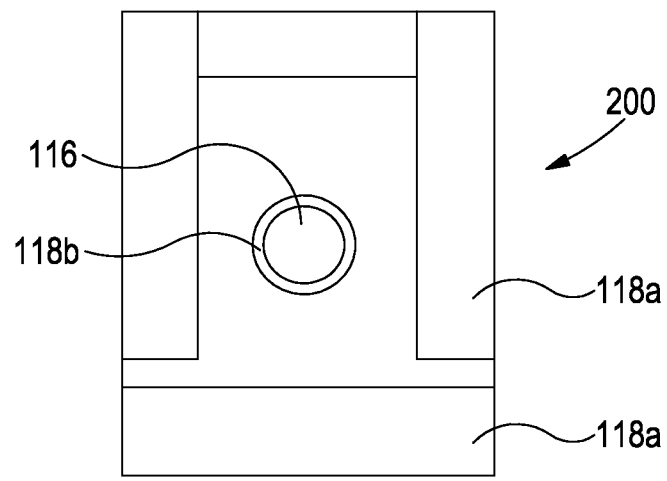
FIG. 13 is a plan view of an alternative indicator section.

Referring now to FIG. 13, there is shown an indicator section 200 from the embodiments illustrated in FIGS. 9, 10 and 11 and having a particular adhesive pattern having strips of adhesive 118*a* around the perimeter and a ring (or donut) of adhesive 118*b* towards the centre. It will be appreciated that the ring of adhesive 118*b* need not be annular, but could be any other suitable geometrical pattern. Inside the ring of adhesive 118*b* there is a combined indicator and substrate layer 116. Depending on the embodiment of indicator device 110, the combined indicator and substrate layer 116 can be covered by a semi-permeable barrier section or layer 500, or can be replaced by an indicator layer 112 covered by a semi-permeable barrier section or layer 500.

Figure 14A:
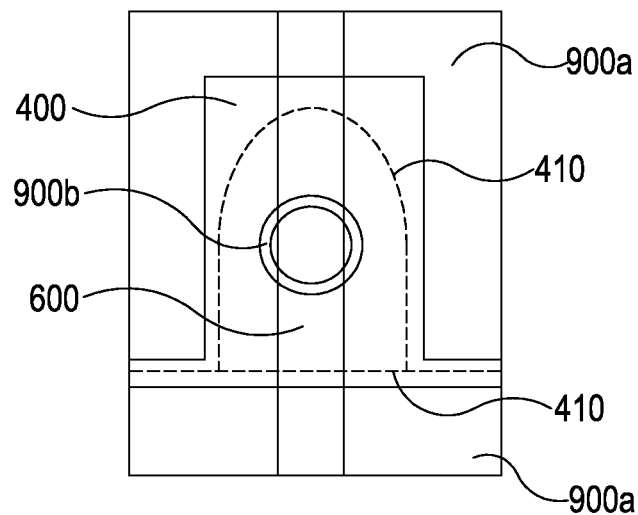
FIGS. 14a and 14b are plan views of an alternative arrangement of activator, adhesive and barrier sections.
Figure 14B:
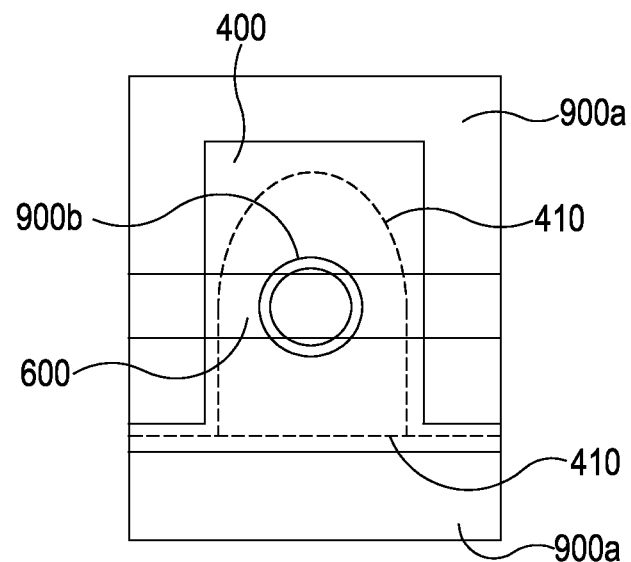

Referring now to FIGS. 14*a* and 14*b*, there is shown in plan view the arrangement of the activator layer 600, the adhesive layer 900, and the substantially impermeable barrier layer of the indicator device 110 as described in FIGS. 9, 10 and 11. In particular, there is shown an activator section 600 and a substantially impermeable barrier layer 400, between which is located an adhesive section 900. The adhesive section 900 has a particular adhesive pattern having strips of adhesive 900*a* around the perimeter and a ring (or donut) of adhesive 900*b* towards the centre.

Also shown are cut lines 410 in the substantially impermeable barrier layer 400. The cut lines 410 are located between the strips of adhesive 900*a* around the perimeter and the ring of adhesive 900*b* towards the centre.

The adhesive ring 900*b* encapsulates a portion of the acid strip 600 that transverses it, preventing that portion from migrating. However, the portion of the acid strip 600 located outside of the adhesive ring 900*b* is able to migrate. Therefore, these embodiments may also utilise the indicator section depicted in FIG. 13 as previously described to mitigate acid from reaching the indicator material 112, 116.

It will be appreciated that the rings of adhesive 900*b* can be any suitable shape or geometrical pattern, provided there is a space with no adhesive within the shape or geometrical pattern.

Figure 15:
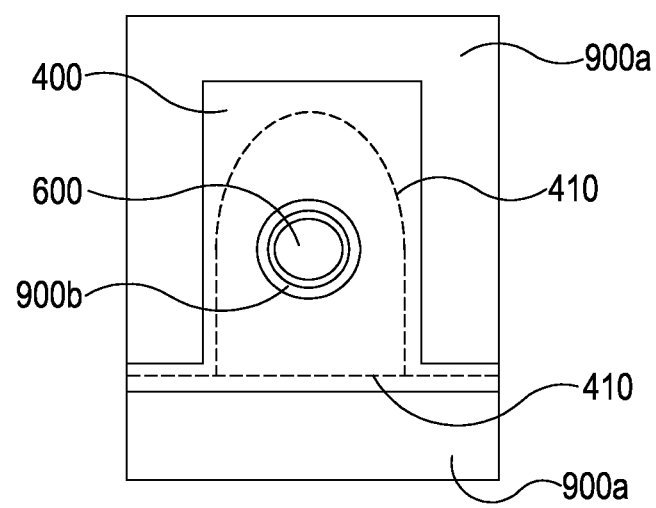
FIG. 15 is a plan view of an alternative arrangement of activator, adhesive and barrier sections.

Referring now to FIG. 15, there is shown in plan view the arrangement of the activator layer 600, the adhesive layer 900, and the substantially impermeable barrier layer 400 of the indicator device 110 as described in FIG. 12. The adhesive section 900 has a particular adhesive pattern having strips of adhesive 900*a* around the perimeter and a ring (or donut) of adhesive 900*b* towards the centre.

Also shown are cut lines 410 in the substantially impermeable barrier layer 400. The cut lines 410 are located between the strips of adhesive 900*a* around the perimeter and the ring of adhesive 900*b* towards the centre. In such an arrangement, the strips of adhesive 900*a* around the perimeter are an outer adhesive layer and the ring of adhesive 900*b* towards the centre is an inner adhesive layer.

Encapsulated by the ring of adhesive 900*b* is an activator section 600, which comprises a portion of acid. As the activator section is wholly encapsulated by the ring of adhesive 900*b*, the acid is prevented from migrating. As there is no acid located outside of the ring of adhesive 900*b*, there is no requirement for an additional ring of adhesive around the indicator material 112, 116 as depicted in FIG. 13.

It will be appreciated that the rings of adhesive 900*b* can be any suitable shape or geometrical pattern, provided there is a space with no adhesive within the shape or geometrical pattern.

In particular, in the context of this description, the term "ring" in reference to shape is not intended to be restricted to annular, but can be any shape (e.g., triangle, square, diamond, rhombus, rectangle, kite, parallelogram, oval, star, pentagon hexagon, etc.) that defines an enclosed space.

In the examples given above, the separable portion is a (substantially) continuous cut line. However, it will be appreciated that the separable portion could also be a discontinuous, dashed or dotted cut line. Also, the separable portion can be a frangible portion, which will break when a certain amount of force is applied. Such frangible portions can be perforated portions, made from a plurality of perforations. In such embodiments, the detachable section and the fixed section may adjacent to each other. Also, the detachable section and the fixed section may be in physical contact with each other or they may be physically separate from each other.

In the examples given above, two or more different adhesives having different adhesive strengths can be used. For example, the adhesive used for the inner adhesive layer can be of a lower adhesive strength than the adhesive used for the outer adhesive layer. In such an example, the inner adhesive layer is, for example, a pressure sensitive adhesive and the outer adhesive layer is, for example, a permanent bond laminating adhesive. This combination of adhesives assists the removal of the detachable section whilst enabling the fixed section to remain fixed in place.

The ring of adhesive as described herein may have a width of from about 0.3 mm to about 0.9 mm. This width of adhesives assists the removal of the detachable section whilst enabling the fixed section to remain fixed in place.

A selection of examples that were prepared and tested are summarised in Table 1 below.

TABLE 1

Examples of timings achieved in embodiments of the indicator device of the present invention

| Intelligent film | Activator | Permeable Barrier | Timing at 5° C. | Timing at 20° C. |
|---|---|---|---|---|
| PR | o-TA | none | 4 days | — |
|  | 4-EBA | none | 5 days | 12 hrs |
|  | o-TA | LOPE | 2.5 months | — |
|  | UD | none | 1 day | 1 hr |
|  | DA | none | — | 6-7 hrs |
|  | IMICHC | none | — | 2.5 hrs |
|  | 2-BOA | none | — | 4.5 hrs |
| MCP | BA | none | — | 4.5 days |
|  | 4-EBA | none | — | 2.5 days |
|  | 2,4-DMBA | none | — | 9-10 days |
|  | p-TA | none | — | 10 days |
|  | BA | LOPE | — | 15-18 days |
|  | 4-EBA | LOPE | — | 3 weeks |
|  | 2,4-DMBA | LOPE | — | 25-28 days |
|  | 4-MNA | LOPE | — | 9-10 days |
|  | DDA | LOPE | — | 1 week |
| CR | BA | none | — | 1 day |
|  | 4-EBA | none | — | ~3 days |
|  | 2,4-DMBA | none | — | 8.5 days |
|  | p-TA | none | — | 8-11 days |
|  | 4-EBA | LOPE | — | 16 days |
|  | p-TA | LOPE | — | 3.2 weeks |
|  | 4-MNA | LOPE | — | 8.5 days |
|  | DDA | LOPE | — | 6 days |

The abbreviations used in Table 1 are summarised below in Table 2.

TABLE 2

List of abbreviations used in Table 1 and full description

| Abbreviation | Full Description |
|---|---|
| PR | Phenol Red |
| MCP | Meta-cresol purple |
| CR | Cresol red |
| BA | Benzoic acid |
| o-TA | Ortho-toluic acid |
| 4-EBA | 4-ethylbenzylbenzoic |
| 2,4-DMBA | 2,4-dimethylbenzoic acid |
| p-TA | Para-toluic acid |
| UD | Undecanoic acid |

TABLE 2-continued

List of abbreviations used in Table 1 and full description

| Abbreviation | Full Description |
|---|---|
| DA | Decanoic acid |
| IMICHC | 1-methyl-1-cyclohexanecarboxylic acid |
| 2-BOA | 2-butyloctanoic acid |
| 4-MNA | 4-methylnonanoic acid |
| DDA | Dodecanoic acid |
| LOPE | Low Density Polyethylene |

The activating agent (chemical agent) can, potentially, be an oxidising agent, water, carbon dioxide, amines, ammonium hydroxide or ammonia. For example, if the active component is reactive to the presence of amines and the like, the chemical agent could be from one or more of ammonia, ammonium hydroxide, propylamine, butylamine, hexylamine and octylamine.

In use, an area of the substantially impermeable barrier layer is removed and the concentration of the activating agent (acid) in the indicator section changes over time, effecting a change in visible properties of the indicator material. Specifically in one embodiment on removal of the detachable section of the removable substantially impermeable barrier layer, the concentration of the activating agent in the indicator layer increases over time.

The substrate layer typically has a thickness of between 12 µm and approximately 100 µm. Alternative substrates that can be used include aluminium oxide foil, polypropylene, and polyethylene terephthalate; and platinised versions thereof.

The indicator layer typically has a thickness between 1 µm and 3 µm. Alternative indicators that can be used include a redox sensitive material, a carbon monoxide sensitive material, a carbon dioxide sensitive material, an oxygen sensitive material and an ammonia sensitive material.

The combined indicator and substrate layer has a thickness of between 30 µm and approximately 100 µm.

The substantially impermeable barrier layer has a thickness of between approximately 23 µm and approximately 100 µm. Substantially impermeable barrier layers that can be used include polyethylene terephthalate, ethylene vinyl alcohol, polyvinylidene chloride, polyvinyl alcohol, low density polyethylene, polypropylene, polyester and aluminium oxide coated polyethylene terephthalate.

The semi-permeable barrier layer has a thickness of between approximately 12 µm and 100 µm. Semi-permeable barrier layers that can be used include polyethylene, polyethylene terephthalate, low density polyethylene, polypropylene, polyurethane and polyvinyl chloride.

Increasing the thickness of any one of these layers will slow down the permeation, and hence increase the time to observe a colour change.

The adhesive layer typically has a thickness between 1 µm and 3 µm. Alternative adhesives that can be used include a rubber based hot melt, an acrylic adhesive, a varnish coated adhesive, an adhesive kill treated adhesive, a treated or coated permanent acrylic, a treated or coated peelable acrylic, a UV curing adhesive, a pressure sensitive adhesive, and UV curable pressure sensitive adhesive.

The release layer may be approximately 50 µm to 100 µm, and is typically between 60 µm and 70 µm. Alternative release layers that can be used include glassine, siliconised glassine paper, and a silicon treated polymer.

The indictor devices as illustrated in the Figures are prepared by laminating printed and filmic layers using standard printing presses as per standard label production methods.

Substrate layers that can be used in conjunction with or as a replacement for those specified above include aluminium foil, aluminium oxide foil, polyethylene terephthalate and/or polypropylene.

In one embodiment the indicator device is an indicator for informing a user when a food stuff or the like is no longer fresh, or no longer considered to be fit for consumption. The indicator layer may be displayed as a dot or a cross inside a coloured ring (a reference section). When the dot or a cross changes colour to the extent that it is the same colour as (or optionally darker) than the ring, the product is no longer fit for consumption. Alternatively, the indicator layer may be displayed as a tick inside a differently coloured ring (a reference section). When the tick is a different colour to the ring, the product is fit for consumption, but when the tick is substantially the same colour as the ring, the product is no longer fit for consumption. A similar arrangement can be used in alternative embodiments (optionally by utilising different dyes), which are useful in detecting whether packages have been opened, whether unopened food is no longer fit for consumption, or whether devices have been exposed to water, for example.

In a further embodiment, the indicator device is used to indicate when a "consume within a certain time from opening" period has passed. Such periods vary from a few days to several months depending on the nature of the perishable item. The indicator device can, for example, be applied to the inside of vacuum or controlled atmosphere packaging. When the packaging is opened, the pull-tab is removed from the indicator device, exposing the indicator layer to the acid, which causes the indicator material to change colour over a set period of time.

Alternatively, the "consume within" indicator device can be applied to the outside of packaging, optionally along with a seal or barrier layer. When the packaging is opened, the pull-tab is removed allowing the indicator layer to be exposed to the acid. The indicator layer will then change colour over a set period of time.

In a further embodiment, the indicator device is incorporated into an anti-counterfeiting device.

The indicator device can be applied to packaging for high value, or often counterfeited goods. When the packaging is opened, the pull-tab is removed and a logo or message appears indicating that the goods are genuine. This could, of course, also be applied to currency and/or documentation.

In the examples given, the barrier and semi-permeable seal layers are polyethylene terephthalate and polyethylene respectively. However, it will be appreciated that any suitable seal having a very low carbon dioxide permeability (thereby preventing carbon dioxide reaching the indicator material) can be used in the barrier layer of the barrier section. Also, the semi-permeable seal layer may be chosen to allow controlled flow of carbon dioxide agent to the indicator material. Examples of suitable materials for use in the barrier layer are: polyethylene terephthalate (PET), ethylene-vinyl alcohol copolymer (EVOH), polyvinylidene chloride (PVDC), polyvinyl alcohol (PVA), polyethylene (PE) and low density polyethylene (LDPE), polypropylene, polyester and aluminium oxide coated polyethylene terephthalate. Examples of suitable materials for use in the semi-permeable seal layer are: polyethylene, polyethylene terephthalate, low density polyethylene, polypropylene, polyurethane and polyvinyl chloride.

The time taken for a colour change to occur can be extended and controlled by using various semi-permeable layers, thereby controlling the rate of migration of the acid.

In the examples given, the chemical species that deprotonates the indicator material is a quaternary ammonium cation, namely tetrabutylammonium hydroxide. However, other suitable quaternary ammonium cations and/or a bases can be used such as, for example: sodium hydroxide, cetyltrimethylammonium hydroxide, potassium hydroxide, calcium hydroxide, tetrakis(2-hydroxyethyl)ammonium hydroxide, benzyltrimethylammonium hydroxide, choline hydroxide, trimethylphenylammonium hydroxide, tetrabutylphosphonium hydroxide and hexamethonium hydroxide.

The indicator devices described herein are useful in the manufacture of "consume within" timers. Consume within timers are typically activated after a package is opened, and are used to indicate when a set period of time has elapsed since opening of the package, the foodstuff within the package having to be "consumed within" that set period of time. The indicator device will change colour once the set period of time has elapsed, thereby advising the user that the foodstuff should no longer be consumed. This helps to prevent consumption of unfit foods, and removes the need for users to try to recall when they first opened foodstuffs.

The thickness of semi-permeable barrier depends on the type of material being used, and the desired length of time for the colour change to take place. Less effective semi-permeable barrier materials typically require to be thicker than more effective semi-permeable barrier materials in order to achieve a particular time for the colour change to take place. Typically, the thicker a semi-permeable barrier becomes, the less flexible it is; this can cause problems in the printing process. For example, an inflexible thick semi-permeable barrier is more likely to peel off the packaging to which it has been applied if that packaging is run over an angled piece of machinery. However, if a semi-permeable barrier is too thin, then it may lack structural integrity and be caused to stretch during the printing process. Therefore, it will be appreciated that the choice of the type and thickness of semi-permeable barrier material is determined by many factors including: the desired length of time for the colour change, the permeability of the semi-permeable barrier to the activating agent (e.g., the acid) and the structural properties of the semi-permeable barrier material.

Various pH sensitive materials can be used, such as: m-Cresol Purple (MCP, Hydroxy triarylmethane), Thymolphthalein (3,3-bis(4-hydroxy-2-methyl-5-propan-2-ylphenyl)-2-benzofuran-1-one), o-Cresolphthalein, Acryloly florescein (AcF1), 13-methyl umbelliferon (BMUB), Bromothymol blue (BTB, Hydroxy triarylmethane), 5' and 6-Carboxyseminaphtholfluorescein (c-SNAFL), S' and 6'-Carboxyseminaphtholrhodamine (c-SNARF), Cresol Red (CR, o-Cresolsulfonephthalein), 2-(2,4-Dinitrophenylaxo)-1-naphthol-3,6-disulphonic acid (DNPA), tris(thenoyltrifluoroacetonato) europium (III) (Eu(tta)1), Fluorescein (Fl, resorcinolphthalein), 7-hydroxycoumarin-4-acetic acid (HCA), 1, Hydroxypyrene-3,6,S-trisulphonic acid (HPTS), Neutral red (NR, toluylene red), Phenol Red (PR, phenolsulfonphthalein), Rhodamine 6G (R6G), Sulforhodamine 101 (SRh), Thymol blue (TB, thymolsulphonephthalein), Texas Red hydrazine (THR), Thymol blue, Phenolphthalein, Phenoltetraiodophthalein, Phenoltetrachlorophthalein, α-Naphtholbenzein or p-Xylenol blue.

In particular, the pH sensitive materials can be Phenol Red (PR, phenolsulfonphthalein), m-Cresol Purple (MCP, Hydroxy triarylmethane) and Cresol Red (CR, o-Cresolsulfonephthalein).

In the examples given the release layer is glassine. It will be appreciated that alternative release layers such as siliconised glassine paper, and a silicon treated polymer may also be used.

The adhesive layers may be a rubber based hot melt, an acrylic adhesive, a varnish coated adhesive, an adhesive kill treated adhesive, a treated or coated permanent acrylic, a patterned adhesive, a treated (or coated) peelable acrylic, a UV curing adhesive, a pressure sensitive adhesive, or UV curable pressure sensitive adhesive.

Various modifications and variations to the described embodiments of the invention will be apparent to those skilled in the art without departing from the scope and spirit of the invention. Although the invention has been described in connection with specific embodiments, it should be understood that the invention as claimed should not be unduly limited to such specific embodiments. Indeed, various modifications of the described modes of carrying out the invention which are obvious to those skilled in the art are intended to be covered by the present invention.

The invention claimed is:

1. An indicator device comprising:
an indicator section comprising an indicator material that displays different visible properties in response to the presence or absence of an activating agent, the indicator material being an acid sensitive material; an activator section comprising an activating agent that effects a change in the visible properties of the indicator material; and a barrier section comprising a barrier layer that is substantially impermeable to the activating agent, the barrier section being located between the indicator section and the activator section;
wherein at least part of the barrier layer that is substantially impermeable to the activating agent is removable and/or rupturable, wherein on removal of and/or rupture of at least part of the substantially impermeable barrier layer the activating agent and the indicator material to come into contact with each other, thereby effecting a change in visible properties of the indicator material:
wherein the activating agent is an organic acid having a molecular weight of between approximately 100 gmol$^{-1}$ and approximately 300 gmol$^{-1}$;
wherein the barrier layer that is substantially impermeable to the activating agent comprises a detachable section and a fixed section;
wherein where the detachable section and the fixed section meet there is provided a separable portion;
wherein the indicator device comprises a first adhesive layer located between the barrier layer that is substantially impermeable to the activating agent and the indicator layer;
wherein the first adhesive layer is arranged in a pattern having an outer adhesive layer and an inner adhesive layer, the separable portion being positioned between the outer adhesive layer and the inner adhesive layer; and
wherein the indicator material is surrounded by the inner adhesive layer which defines an enclosed space.

2. An indicator device as claimed in claim 1, wherein the indicator device further comprises a semi-permeable barrier layer configured to allow controlled movement of the activating agent to the indicator material, optionally wherein the semi-permeable barrier layer is located between the indicator material and the activating agent.

3. An indicator device as claimed in claim 1, wherein the indicator device further comprises one or more adhesive layers, optionally wherein the one or more adhesive layers are located adjacent to or between one or more of the sections, layers, materials and/or agents.

4. An indicator device as claimed in claim 1, wherein the separable portion is sealed, the seal configured to mitigate the activating agent and the indicator material from coming into contact with each other.

5. An indicator device as claimed in claim 1, wherein the inner adhesive layer defines an enclosed space, optionally wherein the inner adhesive layer wholly surrounds the indicator material.

6. An indicator device as claimed in claim 1, wherein the adhesive used for the inner adhesive layer is of a lower adhesive strength than the adhesive used for the outer adhesive layer, optionally wherein the inner adhesive layer is a pressure sensitive adhesive and the outer adhesive layer is a permanent bond laminating adhesive.

7. An indicator device as claimed in claim 3, wherein the indicator device further comprises a second adhesive layer located between or adjacent to the barrier layer that is substantially impermeable to the activating agent and the activating agent.

8. An indicator device as claimed in claim 7, wherein the second adhesive layer is arranged in a pattern having an outer adhesive layer and an inner adhesive layer, the separable portion being positioned between the outer adhesive layer and the inner adhesive layer.

9. An indicator device as claimed in claim 8, wherein the inner adhesive layer defines an enclosed space, optionally wherein the inner adhesive layer wholly surrounds the activating agent.

10. An indicator device as claimed in claim 8, wherein the adhesive used for the inner adhesive layer is of a lower adhesive strength than the adhesive used for the outer adhesive layer, optionally wherein the inner adhesive layer is a pressure sensitive adhesive and the outer adhesive layer is a permanent bond laminating adhesive.

11. An indicator device as claimed in claim 1, wherein the indicator section comprises a substrate material, and wherein the indicator material and the substrate material are incorporated into the same layer so-forming a combined indicator and substrate layer, and wherein the indicator material is dispersed within the substrate material or vice versa, optionally wherein the combined indicator and substrate layer comprises a polymer composite, said polymer composite comprising at least one thermoplastic polymer, and an at least one chemical indicator dispersed in the at least one thermoplastic polymer, the at least one chemical indicator comprising a particulate inorganic substrate, and at least one indicator material, reactive dye or ink coated on and/or impregnated within the particulate inorganic substrate.

12. An indicator device as claimed in claim 1, wherein the indicator material is a pH sensitive material optionally selected from one or more of the group consisting of: m-Cresol Purple (MCP, Hydroxy triarylmethane), Thymolphthalein (3,3-bis(4-hydroxy-2-methyl-5-propan-2-ylphenyl)-2-benzofuran-1-one), o-Cresolphthalein (3,3-Bis(4-hydroxy-3-methylphenyl)-1(3H)-isobenzofuranone), Acryloly fluorescein (AcFl), 13-methyl umbelliferon (BMUB), Bromothymol blue (BTB, Hydroxy triarylmethane), 5' and 6-Carboxyseminaphtholfluorescein (c-SNAFL), 5' and 6'-Carboxyseminaphtholrhodamine (c-SNARF), Cresol Red (CR, o-Cresol sulfonephthalein), 2-(2,4-Dinitrophenylaxo)-1-naphthol-3,6-disulphonic acid (DNPA), tris(thenoyltrifluoroacetonato) europium (III) (Eu(tta)1), Fluorescein (Fl, resorcinolphthalein), 7-hydroxycoumarin-4-acetic acid (HCA), 1, Hydroxypyrene-3,6,S-trisulphonic acid (HPTS), Neutral red (NR, toluylene red), Phenol Red (PR, phenolsulfonphthalein), Rhodamine 6G (R6G), Sulforhodamine 101 (SRh), Thymol blue (TB, thymolsulphonephthalein), Texas Red hydrazine (THR), Phenolphthalein (3,3-bis(4-hydroxyphenyl)isobenzofuran-1 (3H)-one), Thymol blue, Phenoltetraiodophthalein, Phenoltetrachlorophthalein, α-Naphtholbenzein and p-Xylenol blue.

13. An indicator device as claimed in claim 12, wherein the pH sensitive material has a pKa value of between approximately 7.9 and approximately 8.3, optionally between approximately 7.9 and approximately 8.32.

14. An indicator device as claimed in claim 1, wherein the activating agent is a carboxylic acid.

15. An indicator device as claimed in claim 1, wherein the acid is selected from one or more of the group consisting of: aromatic acids, aliphatic acids, and cyclic acids.

16. An indicator device as claimed in claim 1, wherein the acid is selected from one or more of the group consisting of: aromatic carboxylic acids, aliphatic carboxylic acids, and cyclic carboxylic acids.

17. An indicator device as claimed in claim 1, wherein the acid is selected from one or more of the group consisting of: benzoic acid, o-toluic acid (2-methylbenzoic acid), 4-ethylbenzoic acid, 2,4-dimethyl benzoic acid, p-toluic acid (4-methylbenzoic acid), salicylic acid (2-hydroxybenzoic acid), decanoic acid, undecanoic acid, dodecanoic acid, 4-methylnonanoic acid, 4-ethyloctanoic acid, 1-Methyl-1-cyclohexanecarboxylic acid, 2-butyloctanoic acid, tridecanoic acid, tetradecanoic acid, pentadecanoic acid, 3-hydoxybenzoic acid, 4-hydroxybenzoic acid, cyclohexanecarboxylic acid, nonanoic acid, and cyclohexaneacetic acid.

18. An indicator device as claimed in claim 1, wherein the acid has a melting point of at least approximately 20° C., optionally between approximately 20° C. and approximately 220° C., optionally between approximately 27° C. and approximately 217° C.

19. An indicator device as claimed in claim 1, wherein the acid has a molecular weight of optionally between approximately 120 gmol$^{-1}$ and approximately 230 gmol$^{-1}$, optionally between approximately 122 gmol$^{-1}$ and approximately 200 gmol$^{-1}$.

20. A method of detecting the passage of time, comprising the steps of:
    a) providing an indicator device comprising:
    an indicator section comprising an indicator material that displays different visible properties in response to the presence or absence of an activating agent, the indicator material being an acid sensitive material; an activator section comprising an activating agent that effects a change in the visible properties of the indicator material; and a barrier section comprising a barrier layer that is substantially impermeable to the activating agent, the barrier section being located between the indicator section and the activator section; wherein at least part of the barrier layer that is substantially impermeable to the activating agent is removable and/or rupturable,
    wherein on removal of and/or rupture of at least part of the substantially impermeable barrier layer the activating agent and the indicator material to come into contact with each other, thereby effecting a change in visible properties of the indicator material: wherein the activating agent is an organic acid having a molecular weight of between approximately 100 gmol–$^{1}$ and approximately 300 gmo–$^{1}$,
    wherein the barrier layer that is substantially impermeable to the activating agent comprises a detachable section and a fixed section;
    wherein where the detachable section and the fixed section meet there is provided a separable portion;
    wherein the indicator device comprises a first adhesive layer located between the barrier layer that is substantially impermeable to the activating agent and the indicator layer;
    wherein the first adhesive layer is arranged in a pattern having an outer adhesive layer and an inner adhesive layer, the separable portion being positioned between the outer adhesive layer and the inner adhesive layer; and
    wherein the indicator material is surrounded by the inner adhesive layer which defines an enclosed space;
    b) activating the indicator device; and
    c) subsequently detecting a visible change in the indicator material whereby the passage of time is revealed.

21. A method of detecting whether a sealed package has been compromised, comprising the steps of:
    a) providing an indicator device comprising:
    an indicator section comprising an indicator material that displays different visible properties in response to the presence or absence of an activating agent, the indicator material being an acid sensitive material; an activator section comprising an activating agent that effects a change in the visible properties of the indicator material; and a barrier section comprising a barrier layer that is substantially impermeable to the activating agent, the barrier section being located between the indicator section and the activator section; wherein at least part of the barrier layer that is substantially impermeable to the activating agent is removable and/or rupturable,
    wherein on removal of and/or rupture of at least part of the substantially impermeable barrier layer the activating agent and the indicator material to come into contact with each other, thereby effecting a change in visible properties of the indicator material: wherein the activating agent is an organic acid having a molecular weight of between approximately 100 gmol–$^{1}$ and approximately 300 gmo–$^{1}$,
    wherein the barrier layer that is substantially impermeable to the activating agent comprises a detachable section and a fixed section;
    wherein where the detachable section and the fixed section meet there is provided a separable portion;
    wherein the indicator device comprises a first adhesive layer located between the barrier layer that is substantially impermeable to the activating agent and the indicator layer;
    wherein the first adhesive layer is arranged in a pattern having an outer adhesive layer and an inner adhesive layer, the separable portion being positioned between the outer adhesive layer and the inner adhesive layer; and
    wherein the indicator material is surrounded by the inner adhesive layer which defines an enclosed space;
    b) activating the indicator device; and
    c) subsequently detecting a visible change in the indicator material whereby the compromise of the package is revealed.

* * * * *